United States Patent
Ronzani et al.

(10) Patent No.: US 6,552,899 B2
(45) Date of Patent: Apr. 22, 2003

(54) MOBILE COMPUTER

(75) Inventors: Peter A. Ronzani, Los Gatos, CA (US); Andrew Wong, Bethesda, MD (US)

(73) Assignee: Xybernaut Corp., Fairfax, VA (US)

( * ) Notice: Subject to any disclaimer, the term of this patent is extended or adjusted under 35 U.S.C. 154(b) by 204 days.

(21) Appl. No.: 09/850,929

(22) Filed: May 8, 2001

(65) Prior Publication Data
US 2002/0167794 A1 Nov. 14, 2002

(51) Int. Cl.⁷ .............................. G06F 1/20; H05K 7/20
(52) U.S. Cl. ...................... 361/687; 361/683; 361/690; 361/704
(58) Field of Search ............................... 361/687, 704, 361/688–690, 683

(56) References Cited

U.S. PATENT DOCUMENTS

| 5,285,398 A | | 2/1994 | Janik |
|---|---|---|---|
| 5,305,244 A | | 4/1994 | Newman et al. |
| 5,491,651 A | | 2/1996 | Janik |
| 5,844,824 A | | 12/1998 | Newman et al. |
| 5,860,720 A | * | 1/1999 | Negishi et al. ............. 353/74 |
| 6,141,214 A | * | 10/2000 | Ahn ............................ 361/687 |
| 6,262,889 B1 | * | 7/2001 | Newman et al. ............ 361/687 |
| 6,282,089 B1 | * | 8/2001 | Nakanishi et al. .......... 361/687 |
| 6,304,459 B1 | * | 10/2001 | Toyosato et al. ........... 361/681 |
| 6,333,847 B1 | * | 12/2001 | Katsui et al. ............... 361/679 |

\* cited by examiner

*Primary Examiner*—Darren Schuberg
*Assistant Examiner*—Lisa Lea-Edmonds

(57) ABSTRACT

This is a body-supported computer that has safeguards against the heated computer housing injuring the user. A grille that is heat insulating is used on at least one outer surface of the housing. This grille, together with heat dissipating housing materials, keeps the temperature of the body-supported computer and its housing within tolerable limits.

35 Claims, 4 Drawing Sheets

MOBILE COMPUTER

The present application relates to a mobile computer and, more specifically, to a user-supported, heat-insulated computer that can be operated in a hands-free manner.

BACKGROUND OF THE INVENTION

It is known to use wearable or user-supported computers that can be operated in a hands-free manner; an example is the Mobile Assistant® by Xybernaut Corporation. An important feature of these computers is that they permit the user to have freedom to use his or her hands for repairing or other manual functions while still able to use a fully functional computer. As above noted, one of the most well known of these user supported computers is the Mobile Assistant®, computer line available from Xybernaut Corporation of Fairfax, Va. Mobile Assistant® is a registered trademark of Xybernaut Corporation.

Xybernaut-owned U.S. Pat. No. 5,305,244 (Newman I) and U.S. Pat. No. 5,844,824 (Newman II) describe the details and components used in said user-supported computers. U.S. Pat. No. 5,844,824 (Newman II) describes and claims several hands-free activation means and other significant improvements or modifications in user supported computers. Both U.S. Newman I and Newman II are owned by the assignee of the present application and both describe in one embodiment where a rigid computer that has all components in a single housing. The disclosure of U.S. Pat. Nos. 5,305,244 and 5,844,824 are incorporated by reference in the present disclosure.

Other patents describing wearable computers are U.S. Pat. Nos. 5,285,398 (Janik I) and 5,491,651 (Janik II). Both of these patents disclose a non-rigid or a belt worn computer containing the elements or components of a computer in several different housings or pockets. In Janik I, the plurality of computing elements are located in separate pockets on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In both Janik I and Janik II, the flexible wearable computer is in the form of a belt comprising around its periphery sequentially positioned computer elements.

In desk top and in many mobile computers, including laptops, the computer housings become extremely hot due to the heat generated by the CPU and other internal computer components. Of course, fans are used in larger computers but space precludes their use in wearables. Various means such as heat sinks and heat-insulating housings have been considered in wearables to minimize this heat problem but still potential problems exist.

SUMMARY OF THE INVENTION

It is therefore an object of this invention to provide a computer structure devoid of the above-noted disadvantages.

A further object of this invention is to provide a novel heat protective structure for use in a body-supported computer to disperse heat from the interior of the computer.

Another object of this invention is to provide a computer structure having a housing enclosed at least partially by a heat-insulating grate or grille to permit easy handling of the computer even when it is in use.

Still a further object of this invention is to provide a computer structure having means in addition to the grille for dispersing the heat generated within the computer housing.

Yet a further object of this invention is to provide a computer with an optional compartment for a battery to be inserted or attached to the computer housing.

Still a further object of this invention is to provide a mobile computer that optionally has communication means for communicating with other means using cell phones, Local Area Networks (LAN), hardwire phones, radio or infrared technology.

Another object of this invention is to provide a substantially rigid computer structure that can be easily handled by the use of an insulating grille to provide protection against internal heat generated and transferred to the outer surface of the housing.

A further object of this invention is to provide a computer structure that can be touched during or after usage in spite of the generated heat and can be worn interchangeably on the right or left side of a user or on his front or back area as in a vest or other user-supported garment or harness.

A still further object of this invention is to provide a mobile computer structure that can be safely worn on any portion of the body in a hands-free manner and be user protected against the heated housing.

Another still further object of this invention is to provide a mobile computer having outlets or other means to connect onto or to be compatible with peripherals or other components of a stand alone, laptop or desktop computer.

Yet another object of this invention is to provide a computer structure that contains in a single housing and/or in conjunction with a holster or user-supported docking device, substantially all of the components needed in a general purpose or conventional computer, including but not limited to, input/output means, processor means and storage means.

Other objects will become apparent upon a further reading of this disclosure.

The above objects and others are accomplished, generally speaking, by providing a mobile, body-supported computer comprising a computer housing, an insulating grille structure enclosing at least a part of said housing, activating means, means for attaching said computer housing to a user, said computer housing comprising substantially all of the components of a conventional computer.

As noted earlier in this disclosure, wearable computers are completely different in their requirements from desktop or laptop computers. For one thing, the space interior and exterior of a wearable is approximately one-fourth to one-third of the area of a current laptop. This requires that the computer components be much closer together and have less open space in the housing of the wearable. The heat formation created internally must therefore be handled in a unique fashion. Looking to laptops or desktop computers for historical solutions will not work for correcting problems in wearables. Wearables are fully supported by the user whereas desktops and laptops are not; desktops and laptops can be placed on a supporting surface and, in most instances, never touch the user when in use. Therefore, the weight, heat generated and space are unique, critical factors to be considered for wearables. Since the wearable computer always touches the user when functioning, the heat generated becomes extremely important and its dissipation must be solved without regard to desktop or laptop historical solutions. In addition, the computer of this invention is self contained and immune from conditions in the environment.

Also, in a wearable, handling of the computer creates problems because the metal housing becomes too hot and could cause severe burns on the user's hands when handled. The interior generated heat is caused by the CPU and other computer components. Some efforts have been expended to solve this problem such as the use of plastics on the housing surface closest to the user's body. However, this limits the use of metal in the housing which is desirable to conduct the heat from the interior of the housing to the atmosphere. In other words, the more of the housing that is constructed of metal such as magnesium or lightweight aluminum, the more effective will be the heat dissipation from the interior of the computer housing to the atmosphere.

The present invention provides a unique and novel solution to both the handling and heat dissipation of a wearable computer. A heat-insulating grille in a substantially checkerboard configuration is placed in spaced relationship around at least a portion of the computer housing. Since the grille is heat insulating, it provides touch protection for the user when he or she handles the computer during or immediately after use. Since the heat generated within the housing can be substantial, heretofore it was necessary to allow the computer to stand for awhile and cool off. Also, the use of a heat-conducting metal (or other conductors) is not limited as in some of the prior art devices. Since, in one embodiment, all outside faces of the housing are covered by this insulating grille, the entire housing can now be made of metal or other heat-conducting materials.

The insulating effect of this grille is accomplished by providing:

A. a surrounding grille made from heat-insulating materials;

B. an insulating air space between the grille and the adjacent housing face or surface; and C. an insulating air space between the grille and the user's body.

As noted earlier, this grille has a dual effect. It provides an air sink for the housing and it provides means to allow the user to touch or handle the heated computer without the possibility of burn injury.

The grille is constructed in a checkerboard-like pattern with cross pieces having spaces there. These spaces can be large enough to allow access to ports or other connectors in the housing. The portion of the grille closest to the user's body in one embodiment will have belt loops to be used to attach the computer to the user's body. Any other suitable pattern may be used for the grille.

The grille overlayed housing comprises at least one of the following:

A. a heat-conducting material construction in at least a portion of said housing;

B. a heat-insulating material construction in at least a portion of said housing;

C. a compartment for housing a removable hard drive; and

D. connection means or ports for internal connection to a communication means, a battery, a monitor or other peripherals.

E. A compartment for housing a battery which may be removable.

The mobile, body-worn computer of this invention comprises on at least a partially grille-covered computer housing, hands-free activation means and means for attaching the computer housing to a user. The computer housing comprises substantially all of the components of a conventional computer. Any housing section can have means for attachment of cables or other electrical connections, wireless or hardwired. The housing, in one embodiment, has back, top and side sections which are constructed substantially of a heat-conducting and dissipating material whereas the bottom section is preferably constructed substantially of a heat-insulating material. However, with the overlayed insulating grille, all sections of the housing can be constructed of heat-conducting materials, if desired. When this computer is worn, the grille overlayed bottom section is located adjacent a user's body. The problems, as earlier noted, faced with mobile, body-worn computers are completely different from those of stationary or laptop computers. Most importantly, substantial heat is generated by the CPU and, while this is not a significant problem in stationary or laptop computers, it becomes a major problem in body-worn computers since the computer is worn next to the user's body. Some attempts to remedy this problem in body-worn computers is to highly insulate the components and/or the computer housing, but these efforts most often result in a larger and heavier computer. Since size and weight are significant factors in body-worn computers, these prior art efforts have not solved the problem and, for that matter, created the additional problems of size and weight.

By "conventional computer" is meant in this disclosure and in the claims, any computer known and used today such as those available from IBM, Dell, Apple, Compaq, Toshiba, Micron, Hewlett-Packard, etc. The computer structure of this invention in one embodiment has a computer housing that can be worn around the waist of a user and is or may be slightly curved on its bottom or inner side (the side that contacts the user's waist) to be contoured in accordance with the curvature of the user's body or fit into a harness, holster or vest. It has structural dimensions or area that occupies only a relatively small portion of said user's waistline. Thus, unlike Janik I and II above discussed, the housing does not encircle the entire waist of the user. When used as a waist-worn computer, it is important in one embodiment that cables and other electrical connections extend from the back portion of the computer so as to be out of the way and not interfere with the user's hands when he or she is attempting to repair an object or machine or otherwise use their hands. The computer structure is symmetrical; therefore, the computer can be turned upside down as a unit for left-hand operation. The mouse controls (if any) will always be positioned in the front of the computer housing convenient for the right or left-hand user. The housing of the computer of this invention has outlets for connection to other components such as power supplies, monitors, keyboards or any other required component. The spaces in the insulating grille are large enough to permit access to these outlets. All embodiments of a mobile computer described in U.S. Pat. Nos. 5,305,244 and 5,844,824 are included in those structures usable in the present invention with the modification described and claimed herein. The disclosure of these two commonly-owned patents, as above noted, are incorporated by reference into the present disclosure.

The embodiment of this invention that includes voice activation or other suitable activation means when the computer is body worn also includes body-worn display screens such as a head-worn, neck-hung display, (or arm-worn display) or the display can be a flip up or other monitor located on the computer housing or any other suitable display. The computer housing in the present invention includes all of the components found in a conventional computer such as a storage means, processor means, audio transducer and converter means and recognizing means and activation means, all of which are described in detail in U.S.

Pat. Nos. 5,305,244 and 5,844,824. Also included in this embodiment are means for mounting the computer housing onto a user or means to be supported by a user. Generally, attachment is made on a belt worn by a user such as around the waist, over the shoulder or onto the torso. Preferably, in portions of the housing other than the bottom (closest to the user), are heat sinks comprising ribbed or louvered sections to permit heat to be dissipated from the interior of the housing and to allow, together with the grille, a proper internal temperature best suited for computer operation. It is imperative that this body-worn computer be maintained at temperatures safe and suitable to be worn for extended periods of time and handled by a user. The computer housing bottom section in one embodiment generally is made of a lightweight yet rigid plastic or other suitable non-heat conducting material. In the present invention, a substantial or major portion of the top and side sections of the housing are constructed of a heat-dissipating material that transmits or conducts the heat from the internal portion of the housing away from the user and to the atmosphere. These top and side outer sections (away from the body of the user), together with the above-noted heat sinks and enclosing grille, efficiently dissipate heat from the internal portion of the housing making it safe for the user. The portion of the computer housing that contacts the user's body, if desired, could have rubber feet or other insulating material that doubles as a belt loop anchor. The bottom underside of the housing grille will, as mentioned in the preferred embodiment, also have loops through which a belt will fit when attaching to a user. The conduits or connection means which are preferably located in the rear side of the housing are used for cable connection to power means, peripherals and the body or head-mounted display or conventional monitor or other suitable display means. The display used in the present invention can be any type monitor such as head-mounted display, flat panel monitor, wrist or hand-mounted monitor, neck-hung display, eyeglass displays or any other suitable display or monitor.

While not a preferred embodiment, the housing could also have a surface-mounted fan still keeping the CPU self contained and protected from the environment.

When the structure of this invention is used as a manual computer (not hands-free activation), there are located on the top section or other sections of the housing movable levers, joy sticks or buttons or other means; one to operate a mouse and the other for program execution or cursor manipulation. When the mobile function is desired, the top, movable button or lever will always be used in the same manner whether worn on the right or left-hand side of the user.

In one embodiment of the present invention, the upper or top portion of the computer (the part away from the user's body) and sides are constructed of a heat conducting material such as magnesium, aluminum, copper, steel or other suitable known heat conducting materials. This material conducts heat from the interior of the housing and away from the user to the atmosphere. In addition, in one embodiment, a heat sink made up of several louvers or ribs is positioned on any section except for the bottom of the housing, hereby, together with the grille, diverting the heat away from the user's body. Since the heat generated by the CPU chip is substantial, especially in a body-worn computer, it is extremely important for any successful wearable product to effectively minimize this problem. In the present invention, all grille covered sides of the computer housing except the bottom utilize effective heat sinks; the front, top portion and side portions could have heat sinks in the form of heat conducting materials, and the bottom portion (closest the wearer) is constructed of a substantially non-heat conducting material such as some plastics such as ABS resin, FRP resin, rubber, wood, silk, Styrofoam, fiberglass or any other suitable heat insulating material. In one embodiment even the bottom portion is made of a heat conducting material but covered with the heat insulating grille of this invention. It is important in one embodiment of this invention that this heat sink be constructed so that it acts as an air scoop as the wearer walks forward. The air flow into the heat sink is best accomplished if the heat sink is located at least in the front of the housing for maximum air intake. Obviously, it cannot be located at the bottom section of the housing since this is the part abutting the wearer's body and little or no air intake is possible.

The grille enclosing the entire or part of the housing puts an insulating air space between the user and the housing to further reduce the heat problem. This grille also doubles in function as an insulator and user attachment means, i.e. including the loop holders that allow the user to place his belt through the loops provided when the computer is worn. This feature and the above features will be further described in relation to the drawings.

DETAILED DESCRIPTION OF THE DRAWINGS
AND PREFERRED EMBODIMENTS

Figure 1:
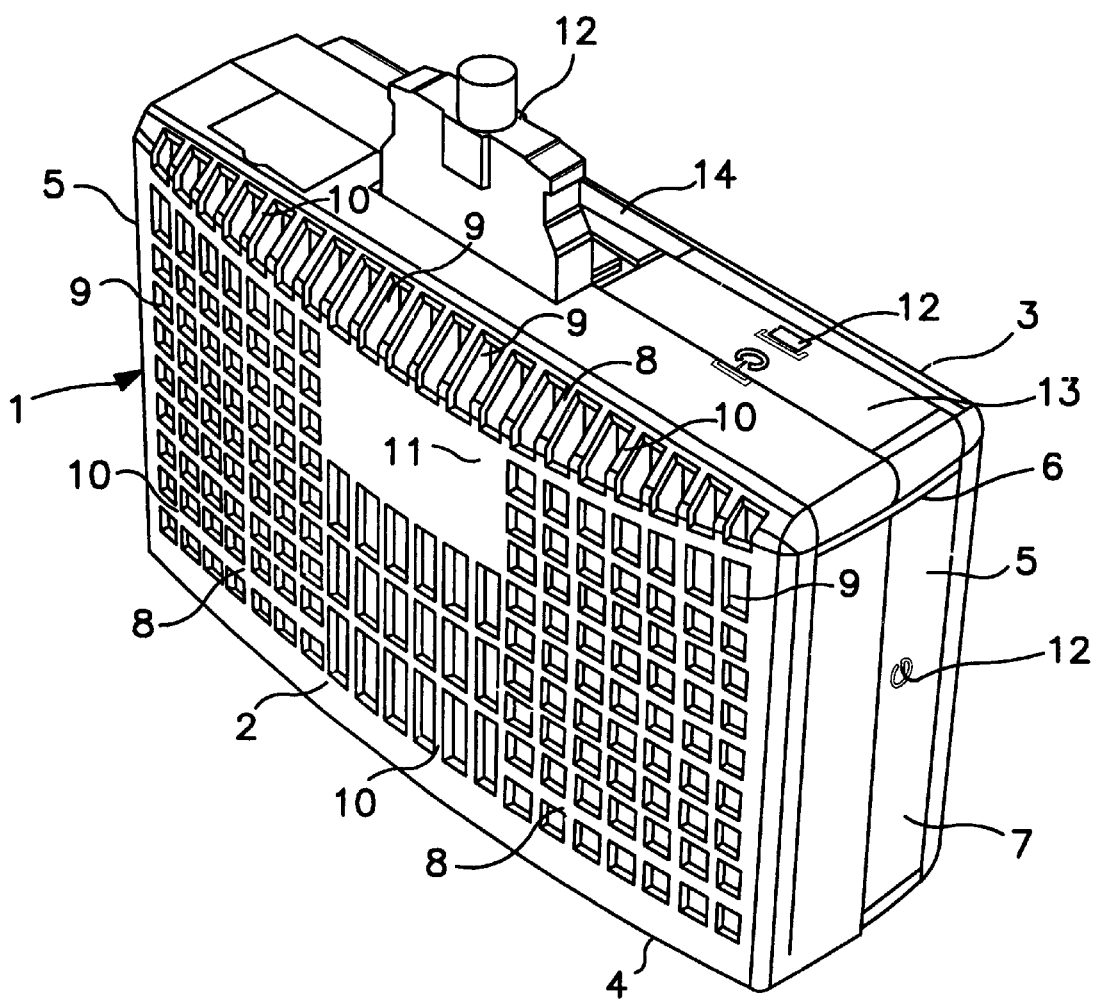
FIG. 1 is a perspective top view of a first embodiment of this invention having the insulating overlayed grille on just the front side of the computer housing.

In FIG. 1, a mobile user supported computer 1 is shown in a substantially rectangular form (any suitable for may be used) having a front portion 2, a bottom portion 3 (closest to the user's body), a back portion 4 and side portions 5. Rib louvers 6 may be used if desired on any portion of the housing 7 to assist in venting heat from the interior of housing 7. The heat insulating grille 8 is shown in this embodiment as covering just the front portion 2 of the housing 7; however, as earlier noted, the grille 8 can be on at least one portion but can be on any or all exposed portions of housing 7. Grille 8 is constructed in this embodiment of a plurality of rectangular openings 9 that are configured to vent heat from the surface(s) of housing 7; this heat is generated within housing 7 by the CPU and other computer components. Cross bars 10 are made of any suitable substantially non-heat conducting material. While the drawings show a blank section 11 for the company's name or logo such as ℂ, this can be omitted and the entire grille 8 can be made up of cross bars 10 and grille openings 9. Ports, doors, peripherals, monitors or any other structure may be positioned on any portion of the housing. These peripheral connecting means are shown on the top section 13 or side section 5 for clarity only and is not intended to be limited to these locations. A battery 14 may be used internally, externally of the housing 7 or may be inserted in part of housing 7 as shown.

Figure 2:
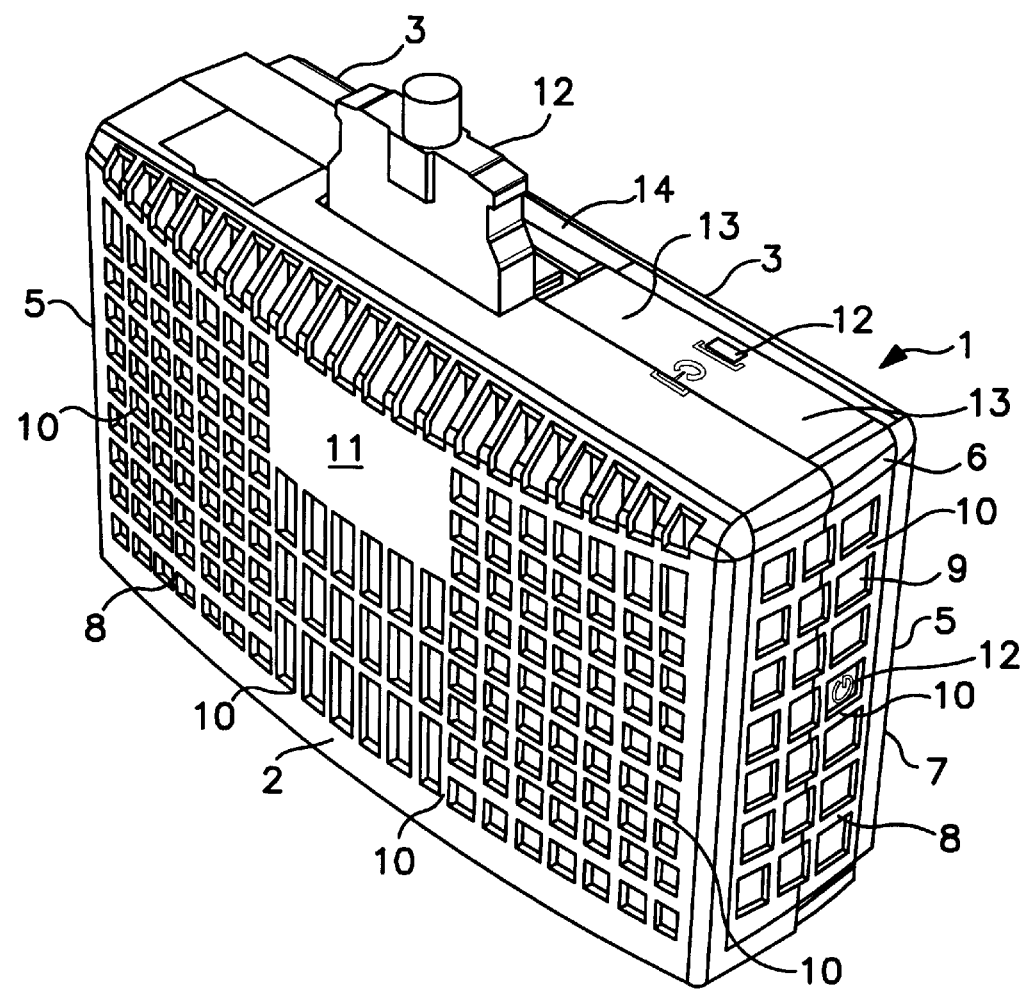
FIG. 2 is a perspective top view of a second embodiment of this invention having the insulating outer grille overlaying all but the top side of the computer housing.
Figure 3:
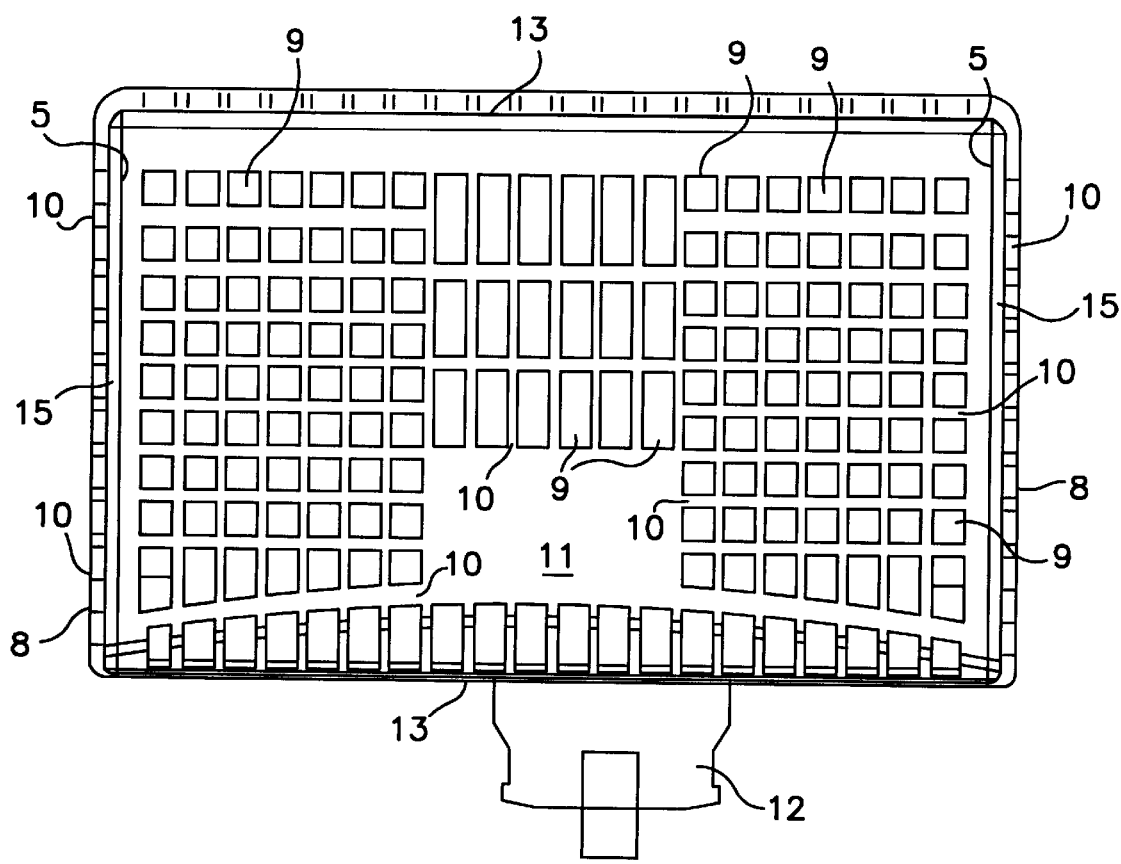
FIG. 3 is a front section top plan view of an embodiment of the computer of this invention having the grille covering the top, back and sides of the housing.
Figure 4:
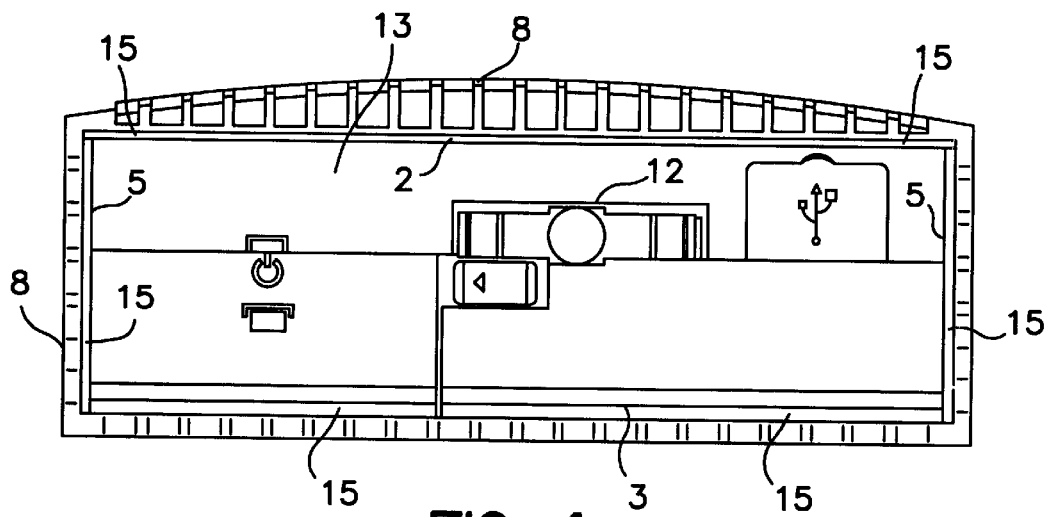
FIG. 4 is a top section top plan view of an embodiment of the computer of this invention having the grille overlaying all but the top section of the housing.

In FIG. 2, computer 1 is shown as having the grille 8 covering all but the top section 13 of housing 7; again this was done only for clarity. If desired top section 13 may also be covered or overlayed with grille 8. When a user picks up the computer 1, he or she will most likely place their fingers over front portion 2 and bottom portion 3 when grabbing the computer 1 thus the grille can preferably be used over front 2 and bottom 3 only. Not shown in FIGS. 1 and 2 are the insulating air spaces 15 located between the computer housing 7 outer surfaces and the inner surfaces of grille 8. These insulating air spaces 15 can be clearly seen in FIGS. 3 and 4. The air spaces 15 as seen in FIGS. 3 and 4 provide an extra heat insulating layer in addition to grille layer 8, and air spaces provided by body spacers and belt loop heat insulating structures 16; see FIG. 4. Thus, in a preferred embodiment with the insulating grille 8 at least one of the following is used.

A. Air spaces 15 between the grille 8 and outer surfaces of housing 7;

B. Air spaces between the bottom 3 grille covered section and the users body provided by insulated belt loop-spacers 16;

C. Heat sinks 6 located as desired on any outer surface of housing 7. These heat sinks 6 can extend from the interior of housing 7 to the atmosphere.

The air spaces 15 are clearly shown in FIGS. 3 and 4, the top section 13 not grille covered in this embodiment. Since heat sinks 6 may or may not be used, they are not shown in FIGS. 3 and 4.

Figure 5:
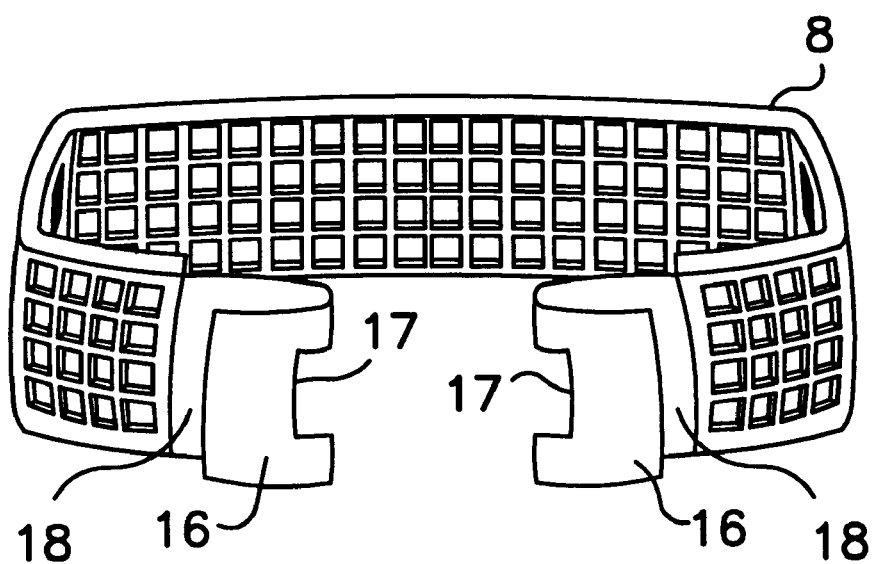
FIG. 5 is a front perspective view of an embodiment of the insulating grille of this invention apart or removed from the computer housing. This grille can be a permanent component of the housing or alternatively can be a removable component.

In FIG. 5, the grille 8 is shown in one embodiment as removed from housing 7. The heat insulating belt loop-spacers 16 are shown as they would be positioned adjacent bottom portion 3 which is closest to the user's body when worn or user supported. The belt loop-spacers 16 comprise belt slots, loops or openings 17 and flat body contact sections 18. As noted earlier, the grille 8 may be removably positioned over the desired housing surfaces, or grille 8 may be permanently attached to housing 7. As shown in FIG. 5, this embodiment has grille 8 only adapted to overlay or cover at least a portion of bottom portion 3, front portion 2 and side portions 5, but all portions may be covered if desired.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A mobile body supported computer comprising a computer housing, a heat insulating grille, hands-free activation means, and means for supporting said computer housing by a user; said computer housing comprising substantially all of the components of a conventional computer, said housing having outside surfaces that when in use at least a portion are adjacent a body of the user, at least a portion of said outside surfaces of said housing are constructed of a heat conducting material, said outside surfaces comprising a front and a bottom section, said bottom section is closest the user when in use, and wherein at least one section of said housing is overlayed by said insulating grille.

2. The computer of claim 1 wherein all heat-conducting sections of said exposed portions are overlayed by said insulating grille.

3. The computer of claim 1 wherein a front and said bottom section of said housing are overlayed by said grille.

4. The computer of claim 1 wherein said insulating grille is a permanently secured component of said computer.

5. The computer of claim 1 wherein said insulating grille is a removable component of said computer.

6. The computer of claim 1 wherein said insulating grille provides heat protective means for a user to handle said computer, wherein said grille additionally provides at least one heat sink for the dissipation of heat from the interior of said housing to an atmosphere surrounding said housing.

7. The computer of claim 6 wherein in addition to said grille a second heat sink(s) is located in any suitable location on said computer housing except for said bottom section, said grille and second heat sink having means to conduct and dissipate heat from an internal portion of said housing to the atmosphere.

8. The computer of claim 1 wherein substantially all of said housing is constructed of a heat conducting material.

9. The computer of claim 1 wherein said bottom section is overlayed by a portion of said grille having belt loops therein; said belt loops providing means for attachment to a user.

10. The computer of claim 1 wherein all heat-conducting portions of said computer housing is surrounded in spaced relationship by said insulating grille, when said computer is worn means are provided to allow an airspace between said bottom section and said user's body.

11. The computer of claim 1 wherein at least one of the following means is used in addition to said insulating grille to dissipate heat from an internal portion of said housing:

a. heat sink(s) in said housing;

b. at least portions of said housing constructed of heat-conducting and heat-insulating materials; or c. means to provide an air space between said bottom section and a user's body, said grille constructed of heat-insulating materials.

12. The computer of claim 1 wherein said grille enclosure is constructed of an insulating material to withstand an appreciable amount of heat, said material selected from the group consisting of rubber, plastic, fiberglass and mixtures thereof.

13. The computer of claim 1 wherein said housing comprises a PC card housing having means to contain a PC card when used therein.

14. The computer of claim 1 wherein said housing comprises a compartment for housing a removable hard drive.

15. The computer of claim 1 wherein said housing comprises means in said computer housing for connection to a member selected from the group consisting of an IrDA transceiver, Blue Tooth cell phones, radio frequency devices and mixtures thereof.

16. The computer of claim 1 wherein an outer section of said housing comprises means for connection to mouse control means.

17. The computer of claim 1 wherein said computer has connecting means to a power supply, a keyboard or a monitor.

18. The computer of claim 1 wherein said hands-free activation means is selected from the group consisting of audio activation means, eye-tracking activation means, electroencephalography activation means, head and arm-tracking means and mixtures thereof.

19. The computer of claim 1 wherein said housing has attachment means to a member selected from the group consisting of a vest, a body-supported holster, and a user-supported docking means.

20. A mobile body-worn computer comprising a computer housing, hands-free activation means, means for attaching said computer housing to a user, said computer housing comprising therein substantially all of the components of a conventional computer, said housing containing front, back, top, bottom and side sections, at least a major portion of said front, back, top and side sections constructed of a highly heat-conducting material and at least a portion of said bottom section constructed of a substantially heat-insulating material wherein said bottom section when said computer is worn has means to allow a spaced relationship of said housing to said user's body, thereby providing an insulating air space, and a substantially heat insulating grille encircling at least a portion of said computer housing.

21. The computer of claim 20 wherein substantially all of the housing is constructed of a material selected from the group consisting of a heat-insulating material, a heat-conducting material and mixtures thereof.

22. The computer of claim 20 wherein said top section comprises an entrance means for a PCMCIA or compact flash compartment, said entrance means constructed of a heat-insulating material.

23. The computer of claim 20 wherein a heat sink is located in any suitable location on said computer housing except for said bottom section, said heat sink in addition to said grille having means to dissipate heat from an internal portion of said housing to the atmosphere.

24. The computer of claim 20 wherein said computer housing has an insulating overlay in the form of said grille, said overlay attached to at least a portion of the bottom section, when said computer is worn there are means to provide an airspace between said bottom section and said user's body.

25. The computer of claim 20 wherein at least one of the following means in addition to said grille is used to dissipate heat from an internal portion of said housing:
   a. heat sinks in said housing; or
   b. at least portions of said housing constructed of heat-conducting materials; or
   c. air space between said housing and said grille and air space between said grille and said user.

26. The computer of claim 20 wherein said housing comprises a PC card housing having means to contain substantially an entire PC card when contained therein.

27. The computer of claim 16 wherein said housing comprises a compartment for housing a removable hard drive and an opening in said front section of said computer housing for internal connection to a an IrDA transceiver.

28. The computer of claim 20 wherein a said section of said housing comprises mouse control means.

29. The computer of claim 20 wherein said computer has connecting means to a power supply, a keyboard or a monitor.

30. The computer of claim 16 wherein said hands-free activation means is selected from the group consisting of audio activation means, eye-tracking activation means, electroencephalography activation means, head and arm-tracking means and mixtures thereof.

31. The computer of claim 20 wherein said heat-conducting material is selected from the group consisting of magnesium, aluminum, lightweight metals, higher weight conductive plastics and mixtures thereof.

32. The computer of claim 20 wherein said heat-insulating material is selected from the group consisting of rubber, plastic, fiberglass or mixtures thereof.

33. A heat-insulating grille having means to be used with and around a wearable computer, said grille constructed of a low heat conducting material and being configured so as to be attached to at least a section of an outside portion of said wearable computer and having means to vent heat generated by said wearable computer, at least one user attachment side of said grille having integral therein slots to accommodate passage of a belt there through so as to attach said computer to said user, said user attachment side having means to contact the user to protect the user from heat generated when said computer is worn and in use.

34. The grille of claim 33 wherein the configuration of said grille is a checkerboard-like construction having cross pieces and spaces between said cross pieces, said spaces having means to allow said heat generated to pass there through.

35. The grille of claim 33 wherein said slots are located on at least two terminal portions of said attachment side of said grille.

* * * * *